United States Patent Office 3,475,408
Patented Oct. 28, 1969

3,475,408
N(6) ALKENYL 5-SUBSTITUTED ADENOSINE
Richard Kuhn and Werner Jahn, Heidelberg, and Karl Dietmann, Mannheim-Waldhof, Germany, assignors to C. F. Boehringer & Soehne GmbH, Mannheim-Waldhof, Germany
No Drawing. Filed Nov. 16, 1966, Ser. No. 594,690
Claims priority, application Germany, Dec. 6, 1965, B 84,851
Int. Cl. C07d 51/54; A61k 27/00
U.S. Cl. 260—211.5                    2 Claims

ABSTRACT OF THE DISCLOSURE

Novel adenosine derivatives having blood pressure reducing activity and being effective as blood vessel dilating agents and for slowing the heart rate having the following formula:

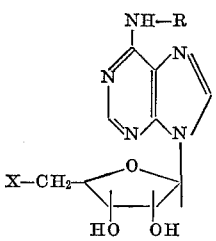

wherein R is an unsubstituted or substituted, saturated or unsaturated, straight-chain or branched aliphatic hydrocarbon radical preferably having from 1 to 6 carbon atoms and X is halogen, azido or alkylmercapto.

---

This invention relates to a series of novel di-substituted adenosine derivatives as well as to the compositions containing the same and the use thereof.

More specifically the novel adenosine derivatives of this invention are represented by the following formula:

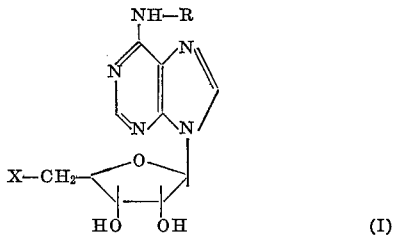

wherein R is an unsubstituted or substituted, saturated or unsaturated, straight-chain or branched aliphatic hydrocarbon radical preferably having from 1 to 6 carbon atoms and X is halogen, azido or alkylmercapto.

The novel adenosine derivatives of the invention have particularly interesting pharmacological properties, on the one hand, to dilate the peripheral blood vessels of the circulatory system and, on the other hand, to suppress the cardiac activity by slowing down the heart rate. According to which of the aforesaid properties are the most strongly marked, the novel adenosine derivatives according to the present invention are suitable for use as agents for reducing blood pressure in high blood pressure diseases, particularly in cases of secondary heart strain, or as agents for dilating the blood vessels and increasing the peripheral blood flow in the case of diseases of the blood vessels.

The compounds according to the present invention are prepared in the conventional manner either by the reaction of compounds having the formula:

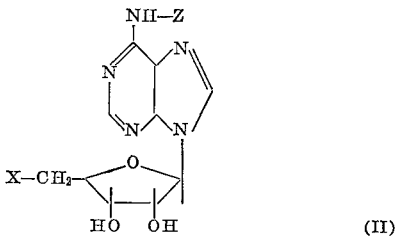

wherein X is as above defined and Z is hydrogen or formyl, or the 2′,3′-isopropylidene derivatives thereof, with an N-alkylation or N-alkenylation agent, followed, if necessary, by the removal of protective groups by acid hydrolysis. Alternatively, the compounds of the invention can be prepared by the reaction of compounds of the formula:

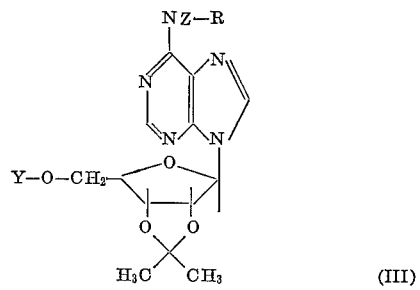

wherein R and Z are as above defined and Y is the residue of a sulfonic acid, with an alkali metal compound of the general formula Me.X (IV), in which X is as above set out and Me is an alkali metal atom, thereafter the protective groups being split off by acid hydrolysis.

As N-alkylation or N-alkenylation agents there can be used all of the conventional reactive alkyl and alkenyl derivatives suitable for carrying out an N-alkylation or N-alkenylation of the sensitive adenosine molecule without decomposition occurring. The corresponding iodides, in the presence of barium hydroxide, have proved to be particularly useful. For the preparation of hydroxyalkyl derivatives, however, the corresponding epoxides are also suitable.

The formyl derivatives of (II) and (III), in comparison with the compounds in which Z designates hydrogen, have proved to be especially useful since, when they are used as starting materials, there are obtained particularly good yields of very pure products. In some cases, for example, in the case of the preparation of 5′-alkylmercapto compounds from compounds of Formula III under the use of alkyl mercaptides, good results can be obtained when starting with compounds of Formula III in which Z is a hydrogen atom.

The preferred sulfonic acid residue Y in the compounds represented by Formula III is the tosyl radical.

The splitting off of the protective groups, and, namely, of the isopropylidene groups and possibly of the formyl groups, takes place simultaneously with the use of dilute acids, preferably at room temperature.

The following examples are drawn to illustrate novel compounds of this invention and will serve to illustrate the process for the preparation of the compounds.

EXAMPLE 1

N(6)-propyl-5′-desoxy-5′-azido-adenosine 10 g. N(6)-formyl-2′,3′-O-isopropylidene-5′-desoxy-5′-azido-adenosine (prepared in the manner described by W. Jahn, Chem. Ber., 98, 1705/1965) were dissolved in 150 ml. dimethyl formamide and the resulting solution admixed with a mixture of 50 g. barium oxide and 1.5 g. barium hydroxide octahydrate. 30 ml. propyl iodide were added thereto and the reaction mixture stirred overnight. The reaction mixture was then diluted with chloroform, centrifuged and the chloroform solution decanted off and washed with water. The residue was dissolved in 30 ml. formic acid and mixed with an equal volume of water. This was then left to stand for 4 days and thereafter neutralized with an aqueous solution of ammonia. The precipitate which was obtained was filtered off with suction and recrystallized from water with the use of activated charcoal. There were obtained 5.1 g. (48% of theory) N(6)-propyl-5'-desoxy-5'-azido-adenosine having a melting point of 112–113° C.

EXAMPLE 2

N(6)-propyl-5'-desoxy-5'-chloroadenosine

N(6)-formyl - 2',3' - O - isopropylidene-5'-chloroadenosine obtained from 5 g. N(6)-formyl-2',3'-O-isopropylidene-5'-tosyl-adenosine (c.f. W. Jahn, Chem. Ber., 98, 1705/1965) was dissolved in 50 ml. dimethyl formamide and, following the addition of 25 g. barium oxide and 0.7 g. barium hydroxide octahydrate, mixed with 12 ml. n-propyl iodide. The reaction mixture was stirred for 18 hours at room temperature, about 100 ml. chloroform then added thereto, centrifuged and the chloroform solution decanted off. After shaking with an aqueous thiosulfate solution and with water, the chloroform solution was evaporated and the isopropylidene group saponified with dilute formic acid according to the procedure described in Example 1. There were obtained 1.2 g. (28% of theory) (N(6)-propyl-5'-desoxy-5'-chloroadenosine having a melting point of 104–108° C.

In an analogous manner but using n-butyl iodide and n-hexyl iodide in place of n-propyl iodide, there was obtained N(6)-n-butyl - 5' - desoxy - 5' - chloroadenosine having a melting point of 90–93° C. and N(6)-n-hexyl-5'-desoxy-5'-chloroadenosine having a melting point of 78–80° C. respectively.

EXAMPLE 3

N(6)-allyl-5'-desoxy-5'-chloroadenosine

Approximately 14 g. crude 2',3'-isopropylidene-N(6)-allyl-5'-tosyl-adenosine (which was prepared by the method described below by the tosylation of 2',3'-O-isopropylidene-N(6)-allyl-adenosine) were dissolved in 85 ml. formic acid-acetic acid anhydride (prepared from equivalent amounts of formic acid and acetic anhydride in the manner described by K. Freudenberg and W. Jakob, Chem. Ber., 80, 326/1947) and then allowed to stand for one day at room temperature. The reaction mixture was then evaporated in a vacuum and the residue dissolved in 100 ml. dimethyl sulfoxide. 9 g. lithium chloride were added thereto and the resulting reaction mixture was heated on a steam bath for 20 minutes. The reaction mixture was then mixed with water and extracted with chloroform. The chloroform solution was evaporated and the residue dissolved in 50 ml. formic acid. Water was thereafter added until cloudiness set in and the mixture then left to stand for 4 days. This solution was then neutralized with a concentrated aqueous solution of ammonia. The resultant precipitate was filtered off with suction and then recrystallized from methanol. There were recovered 3.7 g. (35% of theory) N(6)-allyl-5'-desoxy-5'-chloroadenosine having a melting point of 143–146° C.

The 2',3'-isopropylidene - N(6) - allyl-5'-tosyl-adenosine used as starting material was prepared in the following manner:

10 g. 2',3'-O-isopropylidene-adenosine were slurried in 100 ml. dimethyl formamide and 30 ml. allyl iodide and stirred for 5 hours. The reaction mixture was allowed to stand for 8 hours and thereafter the red-brown reaction mixture decolorized with a concentrated solution of sodium bisulfite, 100 ml. 2 N sodium hydroxide solution were added to the pale yellow solution and the reaction mixture heated to boiling for 25 minutes. After cooling, the reaction mixture was extracted with chloroform. The residue obtained by evaporation of the chloroform extract consisted of 9.1 g. of 2',3'-O-isopropylidene-N(6)-allyl-adenosine in the form of a yellow syrup. This syrup was dissolved in 60 ml. anhydrous pyridine, the solution cooled to —20° C. and 10 g. p-toluene-sulfonic acid chloride then added thereto. The mixture was thereafter allowed to stand, with occasional shaking, for 18 hours at —20° C. Water was added and the resultant mixture was shaken out with chloroform. The chloroform phase was extracted with ice-cooled 2 N sulfuric acid in order to remove the pyridine. Thereafter it was washed with water. After drying over anhydrous sodium sulfate, the chloroform solution was evaporated in a vacuum at the lowest possible temperature. The yield of crude 2',3'-O-isopropylidene - N(6) - allyl - 5' - tosyl-adenosine amounted to about 14 g. and it could be used directly for further reaction.

The following compounds were prepared in analogous manner:

N(6)-methyl-5'-desoxy-5'-chloroadensosine having a melting point of 157–158° C. in a yield of 30% of theory;

N(6)-methallyl-5'-desoxy-5'-chloroadenosine having a melting point of 129–131° C. in a yield of 40% of theory;

N(6) - ethyl - 5'-desoxy-5'-chloroadenosine having a melting point of 153–155° C. in a yield of 25% of theory; and N(6)-isobutyl-5'-desoxy-5'-chloroadenosine having a melting point of 70° C. in a yield of 34% of theory.

EXAMPLE 4

N(6)-allyl-5'-desoxy-5'-azido-adenosine

Crude 2',3'-O-isopropylidene-N(6)-allyl-N(6)-formyl-5'-tosyl-adenosine (see Example 3) was dissolved in 100 ml. dimethyl sulfoxide. 9 g. sodium azide were then added to the solution which was thereafter heated on a steam bath for 15 minutes. The resulting reaction mixture was then diluted with water and shaken out with chloroform. After washing with water, the chloroform solution was dried and evaporated. The residue was then saponified with dilute formic acid by the method described in Example 2. There were thusly obtained 2.2 g. (20% of theory) N(6)-allyl-5'-desoxy-5'-azido-adenosine having a melting point of 90–92° C.

EXAMPLE 5

N(6)-allyl-5'-desoxy-5'-methylmercapto-adenosine

Crude 2',3'-O-isopropylidene-N(6)-allyl-5'-tosyl-adenosine (see Example 3) was added in increments to a solution of sodium methyl mercaptide (prepared from 1.4 g. sodium and 3 g. methyl mercaptan) in 100 ml. liquid ammonia. The reaction mixture was stirred for 4 hours and the ammonia then allowed to evaporate. Following the addition of 1 g. ammonium chloride, the reaction mixture was extracted with chloroform. The evaporation residue obtained from the chloroform solution was dissolved in 1 N sulfuric acid and allowed to stand for 3 days. It was then neutralized with a concentrated solution of ammonia and, after a few hours, the precipitate obtained filtered off with suction. There were obtained 4.4 g. (40% of theory) N(6)-allyl-5'-desoxy-5'-methyl-mercapto-adenosine.

In an analogous manner but starting from 2',3'-isopropylidene-N(6)-methyl-5'-tosyl-adenosine (see Example 3), there was obtained N(6)-methyl-5'-desoxy-5'-methyl-mercapto-adenosine having a melting point of 173–175° C.

The compounds of the invention have particularly interesting pharmacological properties constituting particularly effective blood pressure reducing agents. In order to establish the pharmacological activity of the novel compounds of the invention and to better evaluate these activities compared to a known compound, the following procedures were carried out using in that connection the compounds as hereinafter set out:

(1) N(6)-methyl-adenosine
(2) N(6)-methyl-5'-desoxy-5'-chloroadenosine
(3) N(6)-methyl-5'-desoxy-5'-methyl-mercapto-adenosine
(4) N(6)-propyl-5'-desoxy-5'-chloroadenosine
(5) N(6)-propyl-5'-desoxy-5'-azido-adenosine
(6) N(6)-isobutyl-5'-desoxy-5'-chloroadenosine
(7) N(6)-n-butyl-5'-desoxy-5'-chloroadenosine
(8) N(6)-n-hexyl-5'-desoxy-5'-chloroadenosine
(9) N(6)-allyl-5'-desoxy-5'-chloroadenosine
(10) N(6)-allyl-5'-desoxy-5'-azido-adenosine
(11) N(6)-allyl-5'-desoxy-5'-methylmercapto-adenosine
(12) N(6)-methallyl-5'-desoxy-5'-chloroadenosine.

The compounds in accordance with the invention were evaluated as regards their blood pressure reducing activity using rats as the experimental animals and by comparing the results with the known compound N(6)-methyl-adenosine.

The following procedure was followed:

The average arterial pressure was measured in rats under urethane narcosis. The test substances were each infused for 3 minutes using velocites which were increased in a ratio of 1:2:4. Thus, N(6)-methyl-adenosine was administered for 3 minutes in an amount of 0.1 mg./kg. min.; immediately thereafter for 3 minutes in an amount of 0.2 mg./kg. min., and thereafter for an amount of 0.4 mg./kg. min., accounting for a total dosage of 2.1 mg./kg. During the infusion, the blood pressure decreased from the control values set out in the table and at the end of the infusion, i.e., after the total dosage as set out in col. 1 of the table had been infused, reached the minimum value indicated in the table at the column headed "Min." As the blood pressure as a rule asymptotically approaches this minimum, that dose level was determined which produced 80% of the maximum decrease in blood pressure. This value is defined in the table as the "$DE_{80}$."

Following completion of the infusion, the blood pressure was measured for a further 20 min. and that time determined following which half of the decrease in blood pressure had been reached. In the case of N(6)-methyl-adenosine, this resulted in an increase from 89 to 97 mm. Hg. The time in which this value was reached is designated in the table as the "Half Time Value" and is reported in minutes.

As can be seen from the table, the products corresponding to the compounds in accordance with the invention were superior to the comparison compound N(6)-methyl-adenosine in several respects:

(1) They acted to lower the blood pressure to a greater extent than did the comparison compound. (See, in particular, the results obtained with:

N(6)-methyl-5'-desoxy-5'-chloroadenosine,
N(6)-propyl-5'-desoxy-5'-chloroadenosine,
N(6)-propyl-5'-desoxy-5'-azido-adenosine,
N(6)-isobutyl-5'-desoxy-5'-chloroadenosine,
N(6)-n-butyl-5'-desoxy-5'-chloroadenosine,
N(6)-n-hexyl-5'-desoxy-5'-chloroadenosine,
N(6)-allyl-5'-desoxy-5'-chloroadenosine,
N(6)-allyl-5'-desoxy-5'-azido-adenosine,
N(6)-methallyl-5'-desoxy-5'-chloroadenosine).

(2) The compounds of the invention were effective for the purpose investigated in essentially smaller dosages, as can be recognized from the lower $DE_{80}$ values. (See, in particular, the results obtained with:

N(6)-propyl-5'-desoxy-5'-chloroadenosine,
N(6)-propyl-5'-desoxy-5'-azido-adenosine,
N(6)-isobutyl-5'-desoxy-5'-chloroadenosine,
N(6)-n-butyl-5'-desoxy-5'-chloroadenosine,
N(6)-allyl-5'-desoxy-5'-chloroadenosine,
N(6)-allyl-5'-desoxy-5'-methylmercapto-adenosine,
N(6)-methallyl-5'-desoxy-5'-chloroadenosine).

(3) The effect of the compounds persisted for a much greater period. (See, in particular, the results obtained with compounds:

N(6)-methyl-5'-desoxy-5'-chloroadenosine,
N(6)-methyl-5'-desoxy-5'-methyl-mercapto-adenosine,
N(6)-propyl-5'-desoxy-5'-chloroadenosine,
N(6)-propyl-5'-desoxy-5'-azido-adenosine,
N(6)-isobutyl-5'-desoxy-5'-chloroadenosine,
N(6)-n-butyl-5'-desoxy-5'-chloroadenosine,
N(6)-n-hexyl-5'-desoxy-5'-chloroadenosine,
N(6)-allyl-5'-desoxy-5'-chloroadenosine,
N(6)-allyl-5'-desoxy-5'-azido-adenosine,
N(6)-allyl-5'-desoxy-5'-methylmercapto-adenosine,
N(6)-methallyl-5'-desoxy-5'-chloroadenosine).

TABLE

| Compound | Blood pressure lowering by continuous infusion in rats, mg./kg. | | Blood pressure | | Half Time Value |
|---|---|---|---|---|---|
| | Total | $DE_{80}$ | Control | Min. | |
| 1 | 2.1 | 0.55 | 105 | 89 | 2 |
| 2 | 1.05 | 0.56 | 97 | 69 | 17 |
| 3 | 2.1 | 0.50 | 104 | 81 | >20 |
| 4 | 0.09 | 0.04 | 90 | 43 | >20 |
| 5 | 1.05 | 0.35 | 87 | 42 | >20 |
| 6 | 0.32 | 0.04 | 100 | 50 | 20 |
| 7 | 0.9 | 0.38 | 110 | 74 | >19 |
| 8 | 2.1 | 0.85 | 96 | 74 | >20 |
| 9 | 1.05 | 0.32 | 87 | 37 | >20 |
| 10 | 1.05 | 0.46 | 90 | 49 | >20 |
| 11 | 2.1 | 0.34 | 101 | 80 | 13 |
| 12 | 0.42 | 0.17 | 111 | 70 | >20 |

The compositions of the invention are put up in any suitable dosage form such as tablets or the common powder mix papers, or capsules, for oral administration. They can also be administered intravenously and intramuscularly. For parenteral use or in the capsules or tablets, the composition need only consist of the selected disubstituted adenosine derivative of the type described herein as having a hypotensive and/or blood vessel dilating effect. In the case of the tablet there is included a suitable binder compatible with the principal ingredient and non-toxic when taken in the amount and frequency resulting from the administration regimen of the preparation. In the case of the injectible, the compound is administered in the form of its solution or suspension in water or other aqueous menstruum, i.e., aqueous suspending medium, or in any of the commonly used oil menstruums, i.e., oil suspending media.

What we claim is:
1. N(6)-allyl-5'-desoxy-5'-chloroadenosine.
2. N(6)-methallyl-5'-desoxy-5'-chloroadenosine.

References Cited

UNITED STATES PATENTS 3,346,560  10/1967  Boxer _____ 260—211.5

OTHER REFERENCES

Jahn: Chem. Ber., vol. 98, pp. 1705–1708, 1965.

LEWIS GOTTS, Primary Examiner

JOHNNIE R. BROWN, Assistant Examiner

U.S. Cl. X.R.

424—180